United States Patent [19]

Beyer et al.

[11] Patent Number: 5,551,207

[45] Date of Patent: Sep. 3, 1996

[54] APPARATUS UTILIZING $CO_2$ SNOW FOR PREPARING LAYERED FOOD PRODUCTS

[75] Inventors: Hans-Joachim Beyer, Tuessling; Hans J. Jung, Muehldorf an Inn; Manfred Wild, Meitingen, all of Germany

[73] Assignee: Nestec S.A., Vevey, Switzerland

[21] Appl. No.: 550,888

[22] Filed: Oct. 31, 1995

Related U.S. Application Data

[62] Division of Ser. No. 252,247, Jun. 1, 1994, Pat. No. 5,494,692.

[30] Foreign Application Priority Data

Jul. 12, 1993 [EP] European Pat. Off. ............ 93111111

[51] Int. Cl.$^6$ ............................................. B65B 63/08
[52] U.S. Cl. ............................. 53/127; 53/510; 53/240; 141/129; 141/180
[58] Field of Search ................... 53/510, 511, 474, 53/475, 428, 432, 240, 244, 127, 239; 426/393, 249, 130, 106; 141/129, 163, 178, 180, 234

[56] References Cited

U.S. PATENT DOCUMENTS

| | | |
|---|---|---|
| 2,435,094 | 1/1948 | Moser . |
| 2,768,086 | 12/1956 | Bliley . |
| 2,925,719 | 2/1960 | Robbins et al. ............... 53/239 |
| 3,681,094 | 5/1972 | Rogers et al. . |
| 3,685,308 | 8/1972 | Lundquist . |
| 3,807,187 | 4/1974 | Vorel . |
| 3,905,555 | 9/1975 | Gateshill et al. . |
| 4,001,439 | 5/1977 | Zonni et al. . |
| 4,064,707 | 12/1977 | Connizzoli et al. ............. 141/129 |
| 4,100,304 | 7/1978 | Getman ........................ 141/129 |
| 4,318,935 | 11/1982 | Stussi . |
| 4,594,253 | 6/1986 | Fradin . |
| 4,717,571 | 2/1988 | Okonogi et al. . |
| 4,751,806 | 6/1988 | Gram ............................. 53/240 |
| 4,869,047 | 9/1989 | Nishiguchi et al. ............ 53/510 |
| 4,959,947 | 10/1990 | Reif ............................... 53/240 |
| 5,299,409 | 4/1994 | Daane et al. .................. 53/240 |

FOREIGN PATENT DOCUMENTS

| | | |
|---|---|---|
| 0478316A1 | 5/1992 | European Pat. Off. . |
| 2049463 | 11/1971 | France . |
| 3712414 | 6/1960 | Japan . |
| 61111660 | 3/1984 | Japan . |
| 7213938 | 7/1973 | Netherlands . |
| 1177354 | 9/1970 | United Kingdom . |

*Primary Examiner*—John Sipos
*Assistant Examiner*—Ed Tolan
*Attorney, Agent, or Firm*—Vogt & O'Donnell, LLP

[57] ABSTRACT

An apparatus for preparing a layered food product has a station for introducing a first food component into a container and a station for introducing a second food component into the container on top of the first food component. The apparatus also has a unit for metering $CO_2$ snow onto the first food component and a suction unit for removal of residual $CO_2$ snow before introduction of the second food component into the container, the metering and removal being effected during passage of the first food component in the container through a tunnel in which air conditions about the container may be controlled.

13 Claims, 1 Drawing Sheet

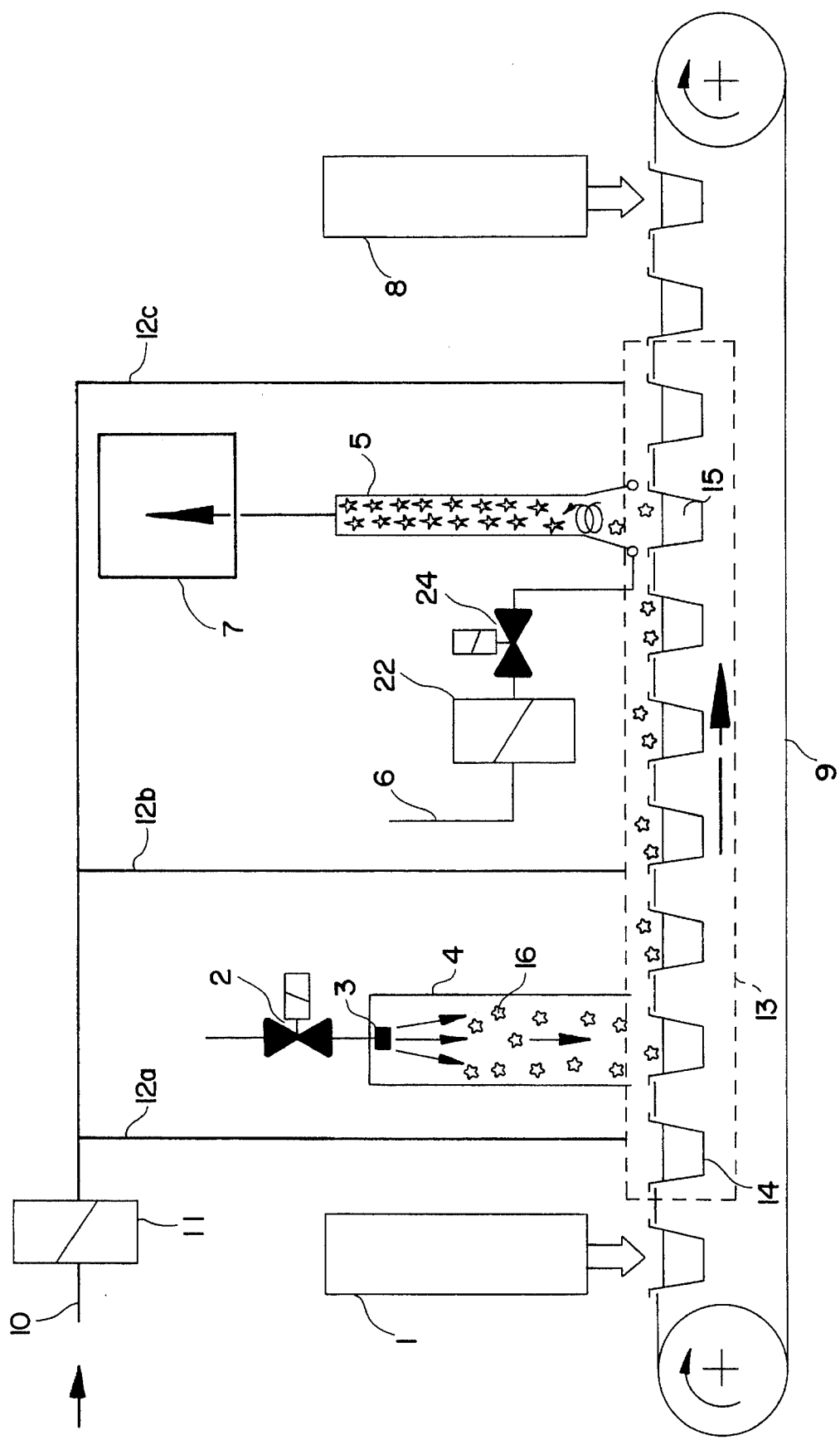

APPARATUS UTILIZING $CO_2$ SNOW FOR PREPARING LAYERED FOOD PRODUCTS

CROSS REFERENCE TO RELATED APPLICATION

This application is a divisional application of application Ser. No. 08/252,247, filed Jun. 1, 1994, now U.S. Pat. No. 5494692.

BACKGROUND OF THE INVENTION

This invention relates to a apparatus for preparing multilayer food product accommodated in a container wherein a food component layer of higher density is arranged over a food component layer of lower density which has been treated with $CO_2$ snow.

Multilayer food products in which the component with the higher density is on top re already known. However, they only keep for short periods and can only be produced by hand, the lower layer being placed in a container and transferred to a refrigerator to set, after which the upper layer is applied. The manual production process is too time-consuming to be carried out on a continuous industrial production line.

A process for the production of two fluid layers lying one on the other is described in European Patent No. 478 316. In this process, $CO_2$ snow is applied to a liquid surface. The disadvantage of this process is that complete and uniform covering of the surface with $CO_2$ snow cannot be guaranteed which leads to temperature differences on the surface. Secondly, it is necessary to wait until the $CO_2$ snow has completely sublimated which takes longer than 2 minutes and, hence, leads to an unacceptable extension of the production line.

SUMMARY OF THE INVENTION

The problem addressed by the present invention was to enable a multilayer food product to be continuously produced on an industrial scale in such a way that it would keep for 5 weeks at a temperature below 10° C.

Another problem addressed by the present invention was to provide a process and a machine for applying $CO_2$ snow to the surface of a food product which would enable the $CO_2$ to be uniformly distributed and would lead to a compact production line.

Accordingly, the present invention provides an apparatus for preparing a layered multi-component food product wherein the apparatus comprises a station for introducing the first food component into a container, a station for introducing the second food component into the container onto the first component, and the apparatus has a metering unit for metering and applying $CO_2$ snow onto the first food component and a suction unit for the removal of residual $CO_2$ snow before introduction of the second component into the container.

As also described below, the apparatus of the present invention further includes a conveyor for transporting the container containing the first food component and a tunnel enclosure configured and positioned for passage of the conveyor and the containers transported therethrough and for controlling air conditions about the transported containers, and the unit for applying $CO_2$ snow and the suction unit are arranged for applying the $CO_2$ snow and suctioning the residual snow within the tunnel.

The stations for introducing the food components comprise metering units for introducing the food components into the container. The $CO_2$ metering and applying unit provides for covering the top surface of the first food component, which is not in solid form, for frosting the top surface to obtain a solidified surface. The $CO_2$ snow metering and applying unit, as described herein, also comprises a hollowed structure which extends from an end having at least one nozzle for forming $CO_2$ snow to an opening positioned above the conveyor belt for applying the $CO_2$ snow.

DETAILED DESCRIPTION OF THE INVENTION

In the context of the invention, any container suitable for food may be employed, and plastic cups, for example made of polystyrene or polypropylene, or glass cups are particularly preferred.

In the context of the invention, the apparatus enables preparation of multilayered food products which keep in a cool place and can be produced on an industrial scale and which are characterized, in particular, by layers of food components having differing densities which are arranged one over the other with the component of higher density lying over the component of lower density and wherein the difference in density between the two food components is at least 0.2. In addition, the multilayered food product optionally may contain other components such as, for example, cake or fruit preparations.

The term "food product" in the context of the invention encompasses dessert, meat mousse, jelly or meat-, fish- or vegetable-containing products.

In the multilayer food product according to the invention, the difference in density is preferably between 0.2 and 0.8. For example, the lower layer has a density of 0.4 to 0.8 while the upper layer has a density of 1 to 1.2. Throughout the present specification, density is expressed in $kg/dm^3$.

The lower layer may be mousse, such as foamed milk dessert or yoghurt, while the upper layer may be fruit jelly or chocolate. The upper layer has a thickness of preferably 1 to 8 mm or even more. Before introduction into the containers, these two components are pasteurized or UHT-treated so that the end product will keep for more than 5 weeks. Other components, for example slices of cake, fruit preparations or other layers, may also be embedded beneath the mousse.

Also in accordance with the present invention, there is provided a process for the production of the multilayer food product mentioned above, in which a container is filled first with the first component and then with the second component and, before the second component is introduced, the surface of the first component is completely and uniformly frosted with $CO_2$ snow, a maximum time of 30 seconds elapsing between introduction of the two components and the residual $CO_2$ snow being removed under suction. Frosting of the surface enables components of relatively high density and relatively low viscosity to be applied without mixing or sinking.

To avoid the condensation of water, controlled air conditions must prevail between the introduction of the two components. By "controlled air conditions" is meant that the air must be dry and adjusted to a certain temperature.

The frosting process, as a whole, encompasses application of the $CO_2$ snow, its contact time and removal of the excess $CO_2$ snow under suction. It is integrated in both time and place in the process by which the individual components of the product are introduced. According to the invention, the surface of the product is frosted and hence solidified to a minimal depth of penetration, in contrast to standard practice where the product as a whole is frosted. This reduces on the one hand the outlay on machinery and on the hand the demand for $CO_2$ snow. The $CO_2$ snow is directly applied to the surface of the product. The contact time of the $CO_2$ is between 5 and 20 seconds, the $CO_2$ being applied to the surface at approximately $-75°$ C. The contact time of the $CO_2$ snow is defined by the intermittence of the filling installation and the distance between the snow metering unit and the snow removal extraction suction unit.

The $CO_2$ snow is introduced all at once in a quantity of around 0.1 to 0.2 $g/cm^2$. Since complete sublimation cannot be achieved over a contact time of 20 seconds, provision has to be made for removal of the residue under suction.

When the surface of the ! first component is frosted, the second component of higher density may be applied thereto. The only requirement is that the surface of the first component should be uniformly and sufficiently frosted and should not be covered with any residual snow.

When the second component is applied, the temperature of the first component returns gradually to the filling temperature.

By virtue of the fact that the structure of the first (lighter) component has already set, there is no danger of the second (heavier) component sinking.

The $CO_2$ snow may be applied either intermittently or continuously.

The apparatus of the present invention operates, as a whole, preferably intermittently, although continuous operation is also possible.

The stations at which the two components are introduced are part of a conventional filling installation which provides for aseptic or ultra-hygienic filling.

To obtain uniform distribution of the $CO_2$ snow, the nozzle is arranged at a distance of 20 to 80 cm from the surface of the first component. The hollow structure in which the nozzle is arranged normally has a rotationally symmetrical shape.

The suction unit consists of a cylindrical hollow structure which substantially corresponds to the diameter of the product container. At least two nozzles for the introduction of compressed air are provided at the lower end of the structure near the surface of the first component. A preferred embodiment comprises four nozzles which are arranged at uniform intervals and which produce a circulating air jet to loosen up the snow. The snow thus loosened up is removed under suction through the cylindrical hollow structure.

The invention is described in more detail in the following with reference to the accompanying drawing which diagrammatically illustrates the apparatus according to the invention.

BRIEF DESCRIPTION OF THE DRAWING

The drawing FIGURE is a diagrammatic representation of the machine according to the invention.

DETAILED DESCRIPTION OF THE DRAWING

The apparatus according to the invention is integrated into an ultra-hygienic filling installation. It consists of a metering unit (1) for the first component, a metering unit (8) for the second component and a conditioning tunnel (13) which is arranged between the two metering units and which guarantees the maintenance of a minimum temperature and the necessary hygienic conditions. A snow metering unit (4) and a snow extraction unit (5) are provided above the conditioning tunnel.

In operation the air conditions in the conditioning tunnel (13) are controlled by introduction of conditioned air via a line (10) through suitable distributor nozzles at various positions fed by lines (12a), (12b), and (12c). The air introduced is freed beforehand from microbial impurities in a sterile filter (11).

Open top containers (14) are delivered to the metering station (1) for the first component by means of an intermittently operating conveyor belt (9). Other components of the multilayer dessert, such as cake or fruit preparations, may already have been introduced beforehand. Also, provision of several filling lanes increases productivity.

After a measured quantity of the first component has been introduced to fill to a surface level beneath the open box, the container passes into the conditioning tunnel (13) under the effect of the intermittent advance of the conveyor belt. Under the snow metering unit (4), a quantity of 0.1 to 0.2 $g/cm^2$ of $CO_2$ snow (16) is applied to the surface of the first component. The $CO_2$ is produced by expansion of liquid $CO_2$ in one or more nozzles which are situated in a nozzle head (3) at the upper end of an open-bottom hollow structure. The snow can be introduced continuously or at intervals by means of a magnetic valve (2).

Under the effect of the $CO_2$ snow, the surface of the first component solidifies uniformly to the required depth. Sterile-filtered compressed air which is obtained via an air line (6), a sterile filter (22) and a magnetic valve (24), tangentially injected intermittently at the snow extraction unit (5) produces an eddy current which loosens up the agglomerated $CO_2$ snow. The $CO_2$ snow thus loosened up is completely removed from the surface of the first component by a suction fan (7). Under the effect of the intermittent advance of the conveyor belt, the container with the frosted surface of the first component passes to the metering unit (8) for the second component where the second component is applied intermittently to the first component.

The surface frosting process may then be repeated at a second frosting unit to apply another component or, alternatively, the container may pass directly to the sealing unit where it is sealed.

The invention is illustrated by the following Example.

EXAMPLE

42% of skimmed milk is mixed at 70° C. with 20% of cream, 5% of sugar, 6.7% of condensate, 2% of skimmed milk powder and 20% of a gelatine-containing wild fruit preparation. The mixture is then UHT-treated at 140° C., cooled and then foamed to obtain an increase in volume of 90%. The mousse is then introduced into the container through a metering nozzle.

The cup is passed beneath the snow metering unit where 7 g of $CO_2$ snow are applied to the surface.

After a contact time of 15 seconds, the remaining $CO_2$ is removed under suction. The surface as a whole has thus been cooled to a temperature of $-50°$ C. and hence solidified. A layer of bilberries is then applied. It consists of 30% of bilberries, 42% of water, 25% of sugar and 1.2% of gelatine and is pasteurized or UHT-treated before application. The mousse has a density of 0.5 and a pH of approximately 4.6 while the fruit layer has a density of 1.2, a pH of 3.7 and a thickness of 5 mm.

We claim:

1. An apparatus for preparing a layered multi-component food product comprising:
   a first unit for metering and introducing an amount of a first food component into a container having an open top;
   a conveyor for transporting the container containing the first food component;
   a tunnel configured and positioned for passage therethrough of the conveyor and the container transported on the conveyor and for controlling air conditions about the container transported;
   a second unit for metering, delivering and applying the $CO_2$ snow into the container and onto the first food component within the tunnel for covering a top surface of the first food component for obtaining a snow-covered top surface so that residual snow cover frosts the top surface to obtain a solidified top surface;
   a third unit for applying suction to the residual snow cover and to the solidified top surface within the tunnel for removing the residual snow cover from the solidified top surface; and
   a fourth unit positioned for, after suctioning, metering and introducing an amount of a second food component into the container onto the solidified top surface.

2. An apparatus according to claim 1 further comprising a set of nozzles for directing air at the residual snow cover within the tunnel for loosening the residual snow cover from the solidified top surface for suctioning by the third unit.

3. An apparatus according to claim 1 or 2 further comprising additional nozzles positioned for blowing air within the tunnel for maintaining conditions within the tunnel which avoid condensation of moisture.

4. An apparatus according to claim 1 or 2 wherein the second unit comprises a nozzle suitable for expansion of liquid $CO_2$ to form $CO_2$ snow.

5. An apparatus according to claim 4 wherein the second unit further comprises a hollowed structure which contains the $CO_2$ expansion nozzle and extends from the $CO_2$ expansion nozzle to an open end positioned above the conveyor for delivering and applying the $CO_2$ snow into the container onto the top surface of the first food component.

6. An apparatus according to claim 5 wherein the $CO_2$ expansion nozzle is positioned so that, in operation, the $CO_2$ expansion nozzle is at a distance of from 20 cm to 80 cm from the top surface of first food component.

7. An apparatus according to claim 4 further comprising additional nozzles positioned for blowing air into the tunnel for maintaining conditions within the tunnel which avoid condensation of moisture.

8. An apparatus according to claim 5 further comprising additional nozzles positioned for blowing air into the tunnel for maintaining conditions within the tunnel which avoid condensation of moisture.

9. An apparatus according to claim 1 wherein the tunnel extends between the first and fourth units.

10. An apparatus according to claim 2 wherein the third unit comprises a cylindrical hollow structure which extends within the tunnel to an open end positioned above the conveyor.

11. An apparatus according to claim 10 wherein the set of nozzles are positioned about the cylindrical structure open end for loosening the residual snow so that the residual snow loosened is removed by suction via the structure.

12. An apparatus according to claim 2 further comprising a sterile filter positioned so that air supplied to the set of nozzles is sterilized.

13. An apparatus according to claim 3 further comprising a sterile filter positioned so that air supplied to the additional nozzles is sterilized.

* * * * *

UNITED STATES PATENT AND TRADEMARK OFFICE
CERTIFICATE OF CORRECTION

PATENT NO. : 5,551,207
DATED : September 3, 1996
INVENTOR(S) : Hans-Joachim BEYER, et al.

It is certified that error appears in the above-identified patent and that said Letters Patent is hereby corrected as shown below:

On the title page, under the heading [75] Inventors, in the address of inventor Beyer, change "an" to --Am--.

Column 3, line 14, delete "all at once".

Column 4, line 19, change "box" to --top--.

Column 4, lines 30-31, begin a new paragraph with the sentence "Sterile-filtered...".

Signed and Sealed this

Twelfth Day of November, 1996

Attest:

BRUCE LEHMAN

Attesting Officer

Commissioner of Patents and Trademarks